Feb. 14, 1956 W. H. BURKHART 2,735,091

ANTIKEY BOUNCE CIRCUIT

Filed March 1, 1952

INVENTOR
WILLIAM H. BURKHART
BY William P. Glover
AGENT

United States Patent Office 2,735,091

Patented Feb. 14, 1956

2,735,091

ANTIKEY-BOUNCE CIRCUIT

William H. Burkhart, East Orange, N. J., assignor to Monroe Calculating Machine Company, Orange, N. J., a corporation of Delaware Application March 1, 1952, Serial No. 274,475

5 Claims. (Cl. 340—345)

Figures 1, 2:
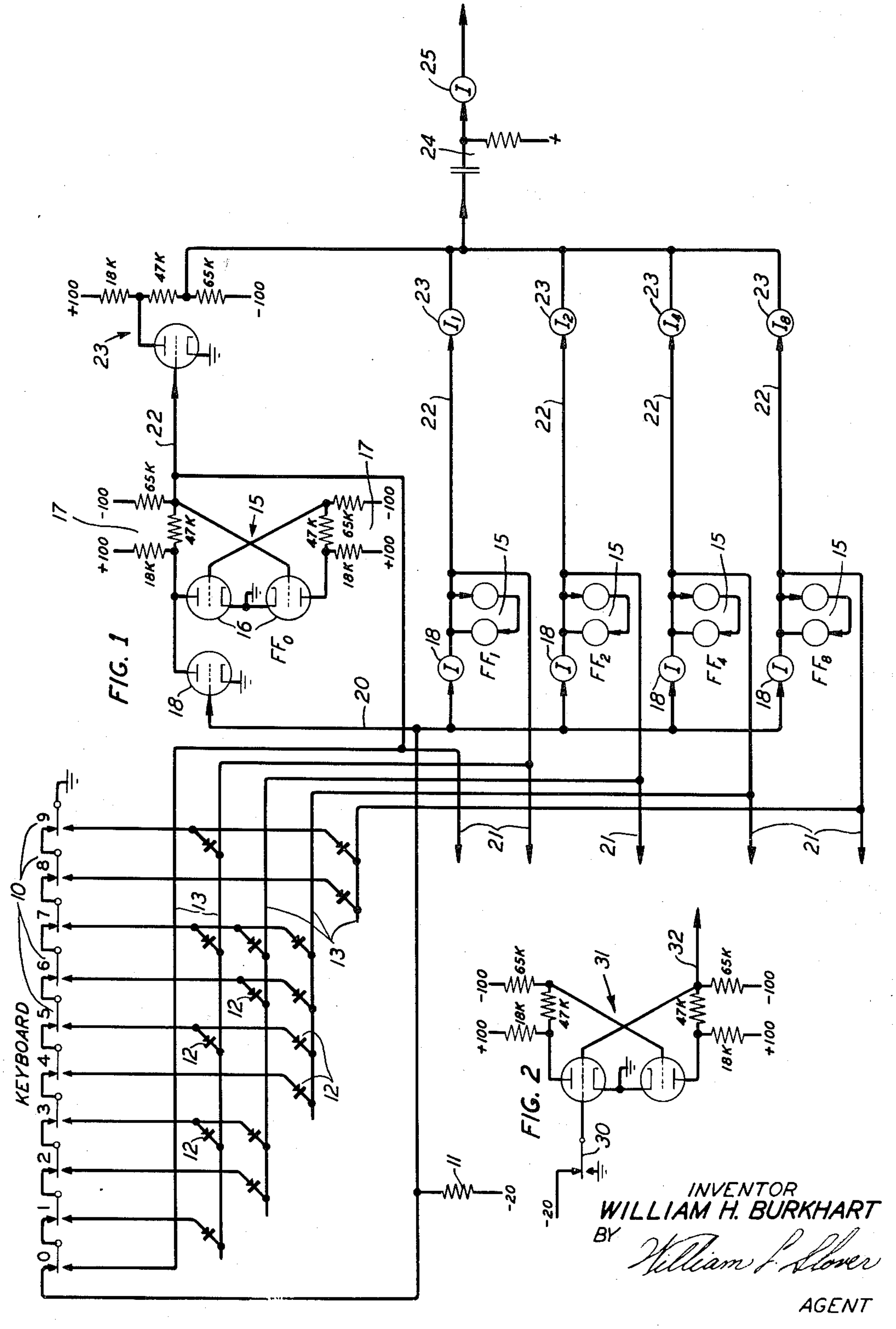

This invention relates to new and useful improvements in electronic keyboard circuits.

Electronic keyboard circuits are extremely useful in many applications, for example as the input medium for an electronic computer. Electronic keyboards have not found wide use, however, due, at least in part, to the difficulties involved in accurately translating the manual operation of a key into a single signal, indicative of such operation. The principal difficulty, it is found, is the suppression of transients which are generated by bouncing or chattering of the keys, and which effect erroneous operations of the electronic circuits.

The principal object of the invention is the provision of an improved electronic keyboard circuit wherein key bounce or chatter is ineffective to cause misoperations.

According to a preferred form of the invention, the several keys of a keyboard form a series path between sources of high and low potential and also, when operated, connect the higher of said sources to the appropriate one or ones of a series of signal lines through an appropriate translating device. Each of said signal lines is connected to a bi-stable flip-flop in such a manner that when the said high potential is applied thereto, the flip-flop is set to a state in which it maintains the signal line at the said high potential. The several flip-flops are reset to the opposite state when the series path through the several keys is re-established. Once set, a flip-flop is not reset until such path is re-established, and when reset, the flip-flop is not again set until a key is fully operated. Thus, the deleterious effects of key bounce or key chatter are eliminated.

In a modified anti-key-bounce arrangement, each key has a flip-flop associated therewith in such manner that the same is set to one state on engagement of the key with its front contact and to the opposite state on engagement of the key with its back contact. In this arrangement, the signal appropriate to the key is taken directly from the flip-flop.

Other objects and features of the invention will become apparent from the following description when read in the light of the drawing wherein Fig. 1 is a schematic wiring diagram of preferred embodiment of one form of the invention and Fig. 2 is a schematic wiring diagram of a modified form of the invention.

Referring to Fig. 1, the keyboard may include along with other keys not shown, a series of digital keys 10 which, through their back contacts, form a series path between ground and a resistor 11 which is connected to a source of negative potential, say —20 volts. The front contacts of the several keys 10 are connected through crystal rectifiers 12 to the appropriate ones of several signal lines 13. In the present instance, the binary coded decimal (1, 2, 4, 8) system of notation is utilized, which results in that there are five lines 13 having the values 0, 1, 2, 4 and 8. The differential nature of the connections of the several keys to said lines is obvious and need not be described. If desired, other keys may be included in the series path for connection with the same signal lines 13 as the digit keys. Each of the signal lines 13 is connected to the grid of one tube of a bi-stable flip-flop generally designated 15. Each flip-flop 15 may comprise a pair of triodes 16, each having its anode connected to the juncture of the two positivemost sections of a three section voltage divider 17. The center tap of each voltage divider is connected to the grid of the other triode of the pair. The values of the voltage divider sections are chosen in such a manner that when the associated triode is cut off, the center tap assumes a potential of approximately 0 volts, and when the triode is conducting, assumes a potential of approximately —20 volts. Obviously, if one triode of a pair is conducting and the center tap of the associated voltage divider is at a potential of approximately —20 volts, the other triode of the pair is cut off and vice versa. As mentioned above, the signal lines 13 are applied each to the grid of one of the triodes of a flip-flop. The other triode of each flip-flop has the anode of a puller triode 18 directly coupled to its anode. As will presently appear, the several signal lines 13 serve to set the flip-flops each to one state and the puller triodes 18 serve to reset them to the opposite state. The grids of the several puller triodes 18 are commonly connected by a line 20 with the resistor 11 described above.

It will be convenient to describe the operation of the device as beginning with the completion of the series circuit through the several keys 10. When the series path through the several keys 10 is completed, the potential of line 20 assumes a value of approximately 0 volts due to the effect of current flow through the resistor 11. This effects conduction of all of the puller triodes 18. The resultant drop in potential of the anodes of the several triodes 18 reduces the potentials at the center taps of the associated voltage dividers 17 to approximately —20 volts. This cuts off the flip-flop triodes whose grids are connected to said center taps if the same had been conducting, and effects conduction of the other triode of each flip-flop. Therefore, all of the flip-flops assume their reset or normal state. Depression of any one of the keys 10 breaks the series connection between ground and the resistor 11, and line 20 assumes a potential of approximately —20 volts. This cuts off the several puller triodes 18. It is to be noted that even though vibration of the operated key against its back contact may vary the conductive states of the several pullers 18, no misoperation is caused as said pullers have already performed their function of resetting the flip-flops. Closure of a key with its front contact applies ground potential to the appropriate line or lines 13 and thereby to the grid of the non-conducting tube of the flip-flop with which each said line is connected. This, of course, effects conduction of said tube and the flip-flop is set to indicate the operation of the key with which it is associated. Here again, chatter of the operated key against the front contacts is ineffective to cause a misoperation, as the cut off tube of each set flip-flop maintains the associated signal line 13 at 0 volt or ground potential.

It will be seen, therefore, that the described circuit effectively eliminates the undesired results of key chatter against either front or back contacts.

In one embodiment of the invention, each of the signal lines 13 may have a branch 21 whose purpose it is to apply the digital signal to some unit of a computer or the like, and also a branch 22. The several branches 22 are applied each to an inverter 23 which is identical with either half of the flipflop described above, and which produces on its output line potentials of approximately 0 and —20 volts. The outputs of the several inverters 23 are commonly applied to a differentiator 24 whose output, in turn, is applied to an inverter 25. The output of inverter 25 may be connected to any cyclically operable device to operate the same once only, no matter for how many cycles a key 10 is held operated. Obviously, as long as a key 10 is held depressed, one or more of the inverters 23 will apply a low potential to the differentiator 24. The differentiator, in customary fashion, will deliver to inverter 25 a single sharp negatively directed pulse at the instant of conduction of one of the inverters 23, which pulse will cut off inverter 25 momentarily. Following said sharp pulse, the output of the differentiator returns to normal, which, in the present instance, is approximately 0 volts, and inverter 25 resumes conduction. When the operated key is restored to normal and the inverter or inverters 23 are cut off, the differentiator delivers a positively directed pulse to inverter 25, but this is ineffective as the inverter is already in the conductive state.

It is believed evident that if the key bounce controlling arrangement were not provided in the above circuit, the differentiator 24 would apply not one but several pulses to inverter 25 with a resultant misoperation of the associated device.

Referring now to Fig. 2, there is illustrated a modified anti-key-bounce arrangement which is particularly well adapted for use with the operation control keys of a keyboard, although, if desired, the same can also be used with the digit keys. As shown, a key 30 is normally connected to a source of negative potential, say —20 volts, through a back contact, but when operated, is connected with a source of more positive potential, say ground (0 volts), through a front contact. Key 30 is directly coupled to the control electrode of one tube of a flip-flop 31 which may be of the same sort as described above. An output line 32 is extended from the center tap of the voltage divider for the second tube of the flip-flop to whatever device it is desired to control with key 30.

For convenience of description, the operation of the device will be described as beginning with the engagement of key 30 with its back contact. At the instant of said engagement, the low potential of —20 volts is applied to the grid of the first tube of the flip-flop and cuts off that tube. Due to normal flip-flop action, the second tube of the pair becomes conducting and a low potential is produced at the center tap of its voltage divider. This low potential not only serves in suitable manner to control the device to which output line 32 is applied, but also is applied to the grid of the first tube of the flip-flop. Thus when key 30 is operated the first tube of the flip-flop is maintained in cut off condition until said key engages its front contact and ground potential is applied to the grid of said tube. Of course, this effects conduction of said first tube and cutoff of the second. As a result, output line 32 assumes a potential of approximately 0 volts. Now, flip-flop 31 maintains output line 32 at substantially 0 volts after key 30 is disengaged from its front contact, and until the key is engaged with its rear contact at which time the flip-flop is reset as described above.

Stated briefly, the preferred form of the invention contemplates the connection of each key controlled signal line of a keyboard to a flip-flop to set the latter to one state when the associated key is operated, and the further provision of means for resetting the flip-flop to the opposite state when the key is restored to normal, the signal line connection to the flip-flops being such that the latter, when set, maintains the signal line at the potential it assumed on operation of the key.

The modified anti-key bounce arrangement, however, contemplates the connection of each of a plurality of keys to a flip-flop to set the latter to one state when the key is operated and to reset the same to the opposite state when the key is restored to normal, and the provision of an output line from the flip-flop to indicate the condition of the associated key, said line, due to the nature of the flip-flop connections, not being affected by key bounce or chatter.

It is to be mentioned that the choice as to which anti-key-bounce arrangement is best suited to any particular keyboard or to any part of a keyboard is a matter of economy. For example, the last described arrangement requires a flip-flop for each key whereas the first described arrangement requires a flip-flop and a puller, not for each key, but for each of a plurality of signal lines which are controlled by a larger number of keys. Obviously, the preferred form of the invention is more economical wherever a plurality of keys are associated with an appropriately lesser number of signal lines or the like. On the other hand, the modified arrangement is more economical wherever each key and the means controlled thereby is independent of the other keys.

While there has been above described an illustrative embodiment of the invention, it is to be understood that many modifications and changes can be made therein without departing from the spirit of the invention, and it is not desired, therefore, to limit the invention except as set forth in the appended claims or as dictated by the prior art.

I claim:

1. In an anti-key-bounce keyboard circuit, the combination of a first potential source, a second, more negative, potential source, a resistor, a plurality of front and back contact keys normally completing a series path from the first source through the resistor to the second source, a plurality of signal lines selectively connectable with said first source through the front contacts of the keys on operation of the latter, a flip-flop connected to each said line and set to one state on application thereto of the potential of said first source, each flip-flop when so set maintaining the associated line at substantially the potential of said first source, and means for resetting said flip-flop to the opposite state on establishment of said series path.

2. In an anti-key-bounce keyboard circuit, the combination of a plurality of front and rear contact keys normally connected in series by their rear contacts, two sources of potential, one more negative than the other, a resistor connected between said series connection and the more negative source of potential, a plurality of signal lines selectively connectable with the source of less negative potential through the front contacts of the keys, a flip-flop connected to each signal line to be set to one state on connection of the associated signal line with said less negative source, each flip flop when so set maintaining the associated signal line at substantially said less negative potential, and means for resetting all set flip-flops to the opposite state in establishment of said series connection.

3. The combination according to claim 1 wherein said means includes a puller tube for each flip-flop and connections between the control electrode of each puller and said resistor.

4. The combination according to claim 2 wherein said means includes, for each flip-flop, a puller controlled by potential changes at the juncture of said resistor and said keys.

5. In a keyboard anti-key-bounce circuit, the combination of a bi-stable flip-flop including a pair of electronic tubes, a key D.-C. coupled to the control electrode of one of said tubes for applying, alternatively, an operating or a cut-off potential thereto, and an output signal line from the other of said tubes maintained at one or the other of two predetermined potentials in accordance with the state of the flip-flop.

References Cited in the file of this patent

UNITED STATES PATENTS

| | | |
|---|---|---|
| 2,349,129 | Albert | May 16, 1944 |
| 2,503,127 | Mumma | Apr. 4, 1950 |
| 2,521,788 | Grosdoff | Sept. 12, 1950 |
| 2,563,102 | Crosman | Aug. 7, 1951 |
| 2,577,141 | Mauchly et al. | Dec. 4, 1951 |
| 2,584,363 | Mumma | Feb. 5, 1952 |

OTHER REFERENCES

How an Electric Brain Works, part IV, pages 70, 71 and 72 of Radio Electronics magazine, Jan. 1951, page 72, Fig. 2.